(12) United States Patent
Sittler et al.

(10) Patent No.: US 6,473,711 B1
(45) Date of Patent: Oct. 29, 2002

(54) INTERCHANGEABLE DIFFERENTIAL, ABSOLUTE AND GAGE TYPE OF PRESSURE TRANSMITTER

(75) Inventors: Fred C. Sittler; Stanley E. Rud, Jr., both of Victoria; Carl R. Gansen, Belle Plain, all of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/373,930

(22) Filed: Aug. 13, 1999

(51) Int. Cl.⁷ .............................. G01L 13/00; G01L 7/00
(52) U.S. Cl. .................. 702/138; 73/718; 73/721; 73/728; 137/597; 700/82
(58) Field of Search ................. 73/37, 718; 702/45, 702/47, 50, 55, 138, FOR 128, FOR 143, FOR 159, 31

(56) References Cited

U.S. PATENT DOCUMENTS

| | | | |
|---|---|---|---|
| 3,735,639 A | * 5/1973 | Akeley | 73/728 |
| 3,894,435 A | * 7/1975 | Shimada et al. | 73/721 |
| 4,131,088 A | 12/1978 | Reddy | 123/32 EJ |
| 4,598,381 A | 7/1986 | Cucci | 702/138 |
| 4,667,284 A | * 5/1987 | Asami | 700/82 |
| 4,818,994 A | 4/1989 | Orth et al. | 340/870.21 |
| 4,949,581 A | 8/1990 | Rud, Jr. | 73/706 |
| D358,782 S | 5/1995 | Louwagie et al. | D10/96 |
| 5,493,512 A | 2/1996 | Peube et al. | 364/510 |
| 5,495,769 A | 3/1996 | Broden et al. | 73/718 |
| 5,606,513 A | 2/1997 | Louwagie et al. | 702/138 |
| 5,616,861 A | 4/1997 | Hagen | 73/180 |
| 5,637,802 A | 6/1997 | Frick et al. | 73/724 |
| 5,764,928 A | 6/1998 | Lanctot | 710/105 |
| 5,870,695 A | 2/1999 | Brown et al. | 702/138 |
| 5,899,962 A | 5/1999 | Louwagie et al. | 702/138 |
| 6,016,706 A | 1/2000 | Yamamoto et al. | 73/727 |
| 6,023,978 A | 2/2000 | Dauenhauer et al. | 73/720 |
| 6,089,097 A | * 7/2000 | Frick et al. | 73/718 |
| 6,176,262 B1 | * 1/2001 | Nimberger | 137/597 |

FOREIGN PATENT DOCUMENTS

WO    WO 98/10249    9/1997

* cited by examiner

*Primary Examiner*—John S. Hilten
*Assistant Examiner*—John Le
(74) *Attorney, Agent, or Firm*—Westman, Champlin & Kelly, P.A.

(57) ABSTRACT

A pressure transmitter with first and second absolute pressure sensors receives process pressures from corresponding first and second process inlets. A transmitter circuit coupled to the first and second absolute pressure sensors generates a differential pressure type output. A third absolute pressure sensor coupled to the transmitter circuit receives atmospheric pressure from a third inlet. The transmitter circuit generates a second type of transmitter output that can be a gage or absolute pressure type. Single crystal. sapphire pressure sensors are preferred to provide enough accuracy for measuring accurately over 200:1 pressure range.

17 Claims, 7 Drawing Sheets

INTERCHANGEABLE DIFFERENTIAL, ABSOLUTE AND GAGE TYPE OF PRESSURE TRANSMITTER

BACKGROUND OF THE INVENTION

In fluid process control applications in chemical, pulp and food processing plants, different types of pressure transmitters are used. These types include the absolute pressure transmitter that measures a process pressure relative to a vacuum, the gage pressure transmitter that measures a process pressure relative to local atmospheric pressure, and the differential pressure transmitter that measures a difference between two process pressures. Pressure transmitters also typically measure pressure over only a limited range of pressure within specified accuracy, and typically a transmitter will be manufactured in 5 or more overlapping ranges, each specified to measure pressure accurately over about a 100:1 ("turndown") range to fill application needs up to 69,000 kPa (about 10,000 psi).

The different types and ranges are generally not fully interchangeable. A large fluid process control plant will typically have dozens or hundreds of pressure transmitters of all three types and differing ranges, leading to costly problems with stocking many types of replacement transmitters, and potential for damage due to overpressure when a low range pressure transmitter is installed in error in a high pressure installation.

SUMMARY OF THE INVENTION

A transmitter can be used interchangeably in absolute, gage, and differential pressure measurement applications and has adequate range so that fewer types of transmitters can be stocked to fill the needs of a process control plant. The pressure transmitter generates differential and non-differential outputs.

The transmitter comprises two absolute pressure sensors adapted to sense pressures P1 and P2 at process inlets, and a third absolute pressure adapted to sense atmospheric pressure. A transmitter circuit couples to the three absolute pressure sensors, and the transmitter circuit generates differential and non-differential type outputs, such that the transmitter is interchangeably adaptable between differential and non-differential installations.

The transmitter has three absolute pressure sensors, and the three pressures P1, P2 and P3 are sensed independently. The conventional arrangement where a single differential sensor measures the differential pressure (P2−P1) is avoided, and thus there is no need to sense line or static pressure to provide line pressure compensation for the differential pressure measurement. The complexity of the linearization and compensation task for each sensor is reduced because each sensor is only subjected to one pressure. Moreover, multiple types of outputs can be provided by a single pressure transmitter, improving interchangeability of replacement transmitters and reducing the cost of stocking and manufacturing large numbers of transmitter types.

The availability of multiple outputs makes it possible for one transmitter to perform up to three pressure measurements. Each of the process inlets can be connected to separate process pressures and the transmitter will provide separate absolute pressure outputs representing the process pressures. The atmospheric inlet, which is threaded, can be connected to a third pressure rather than being vented to the atmosphere, allowing a third measurement to be taken. The availability of the multiple outputs also makes it convenient and economical to perform redundant measurements on a single process pressure for added reliability in case of a sensor failure. With three sensors available in the transmitter, majority voting logic can be included in the transmitter to allow redundant measurement to continue with two sensors after one sensor has failed.

DETAILED DESCRIPTION OF THE PREFERRED EMBODIMENTS

Figure 1:
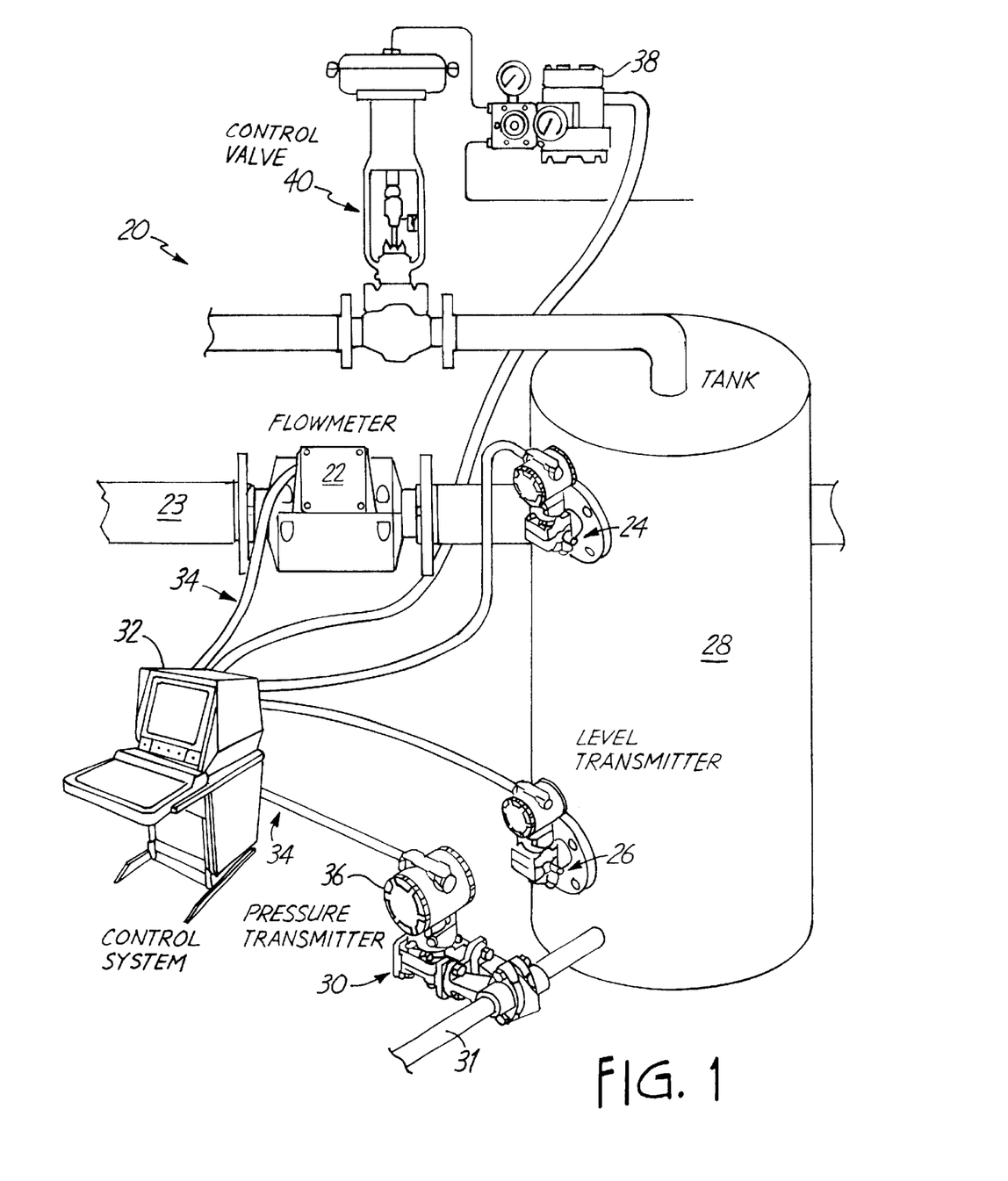
FIG. 1 shows a typical process control environment for pressure transmitters.

In FIG. 1, a typical environment for an industrial pressure transmitter is illustrated at 20. In FIG. 1, process variable transmitters such as flow meter 22 in process fluid line 23, level transmitters 24, 26 on tank 28 and integral orifice flow meter 30 in process line 31 are shown electrically connected to control system 32. Process variable transmitters can be configured to monitor one or more process variables associated with fluids in a process plant such as slurries, liquids, vapors and gasses in chemical, pulp, petroleum, gas, pharmaceutical, food and other fluid processing plants. The monitored process variables can be pressure, temperature, flow, level, pH, conductivity, turbidity, density, concentration, chemical composition or other properties of fluids. A process variable transmitter includes one or more sensors that can be either internal to the transmitter or external to the transmitter, depending on the installation needs of the process plant. Process variable transmitters generate transmitter outputs that represent the sensed process variable. Transmitter outputs are configured for transmission over long distances to a controller or indicator via communication busses 34. In typical fluid processing plants, a communication bus 34 can be a 4–20 mA current loop that powers the transmitter, or a fieldbus connection, a HART (Highway Addressable Remote Transmitter) protocol communication or a fiber optic connection to a controller, a control system or a readout. In transmitters powered by a 2 wire loop, power must be kept low to provide intrinsic safety in explosive atmospheres.

In FIG. 1, integral orifice flow meter 30 includes pressure transmitter 36 that couples along a communication bus 34 connected to it. Level transmitters 24, 26 also include pressure transmitters. Control system 32 can be programmed to display process conditions for a human operator, and can be programmed to sense the process conditions and control the process via output devices such as current to pressure converter 38 and control valve 40, for example.

In FIG. 1, pressure transmitters at 24, 26 and 36 have pressure sensors that are exposed to process fluids in various pipes and tanks that can be corrosive.

Figure 2:
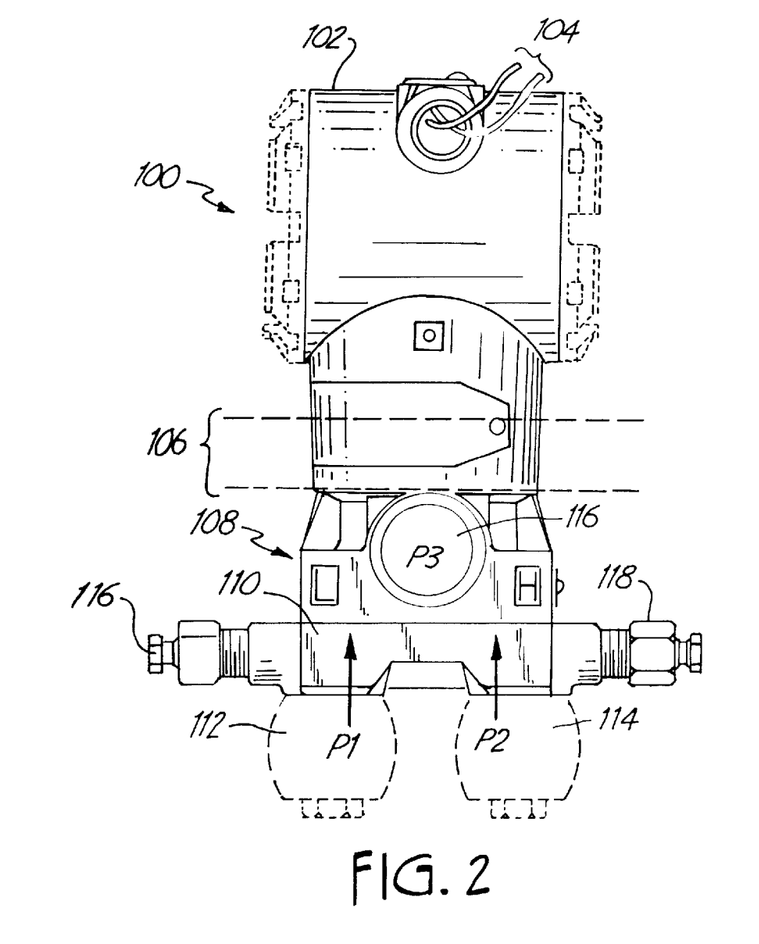
FIG. 2 shows a front view of an embodiment of a multiple output pressure transmitter.

In FIG. 2, a front view of an embodiment of a multiple output pressure transmitter 100 is shown. Transmitter 100 is interchangeable and thus has a differential output and at least one non-differential output representing pressures. A differential output is an output that is an enhanced function of two sensed process pressures to deliver an output related to the difference between the two sensed process pressures. A non-differential output is not a differential output. A differential pressure installation is an installation in which two different process pressures are connected to the transmitter. A typical differential pressure installation is an orifice plate installation. A non-differential pressure installation is an installation in which a single process fluid pressure is connected to the pressure transmitter. Non-differential pressure installations are typically either absolute or gauge pressure measurements. Pressure transmitter 100 includes an upper housing 102 that encloses electronic circuitry and a wiring compartment for output circuit 104. Upper housing 102 is internally threaded at 106 and mates with corresponding external threads on lower housing 108. The threads on upper housing 102 and lower housing 108 fit closely and form a flameproof joint. Transmitter 100 is sealed and forms an explosion proof housing suitable for a process control environment as defined by industry safety standards. Output circuit 104 is an intrinsically safe circuit as defined by industry safety standards. Process pressures P1 and P2 are coupled to the transmitter through flange 110 and flange adapter unions 112, 114. Flange 110 includes vent/drain valves 116, 118 which can be opened to vent gas from liquid lines, or drain liquid from gas lines, depending on the application. Pressure transmitter 100 also includes an inlet 116 which receives atmospheric pressure at the outside of the transmitter. Inlet 116 is internally threaded, and a calibrated source of pressure can also be connected to it. Inlet 116 can also be connected via pipe to a nearby location where atmospheric pressure is less affected by wind. Pressure transmitter 100 includes three absolute pressure sensors (not shown) that receive pressures P1, P2 and P3 respectively. Output 104 is a two wire circuit and typically connects to a two wire 4–20 mA process control loop which energizes the transmitter.

Figure 3:
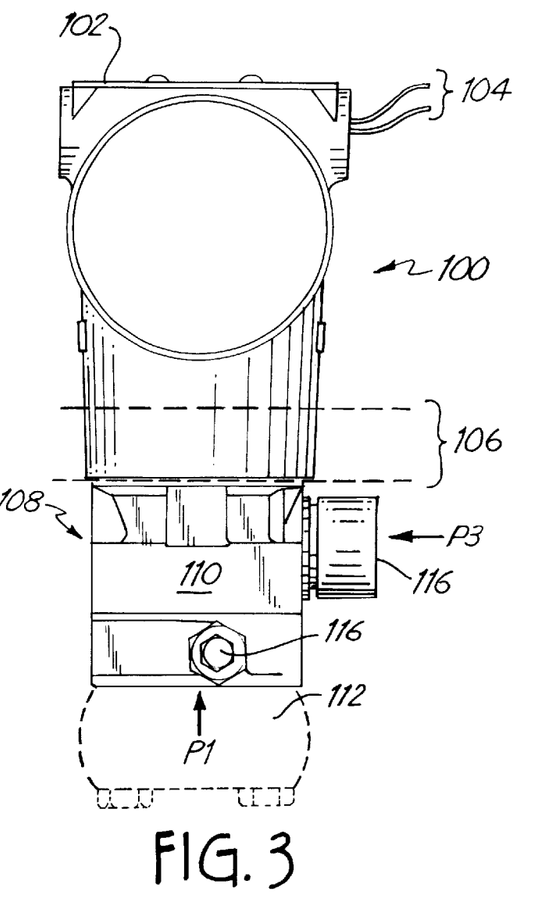
FIG. 3 shows a side view of an embodiment of a multiple output pressure transmitter.

In FIG. 3, a side view of transmitter 100 is shown with the same reference numerals shown in FIG. 2.

Figure 4:
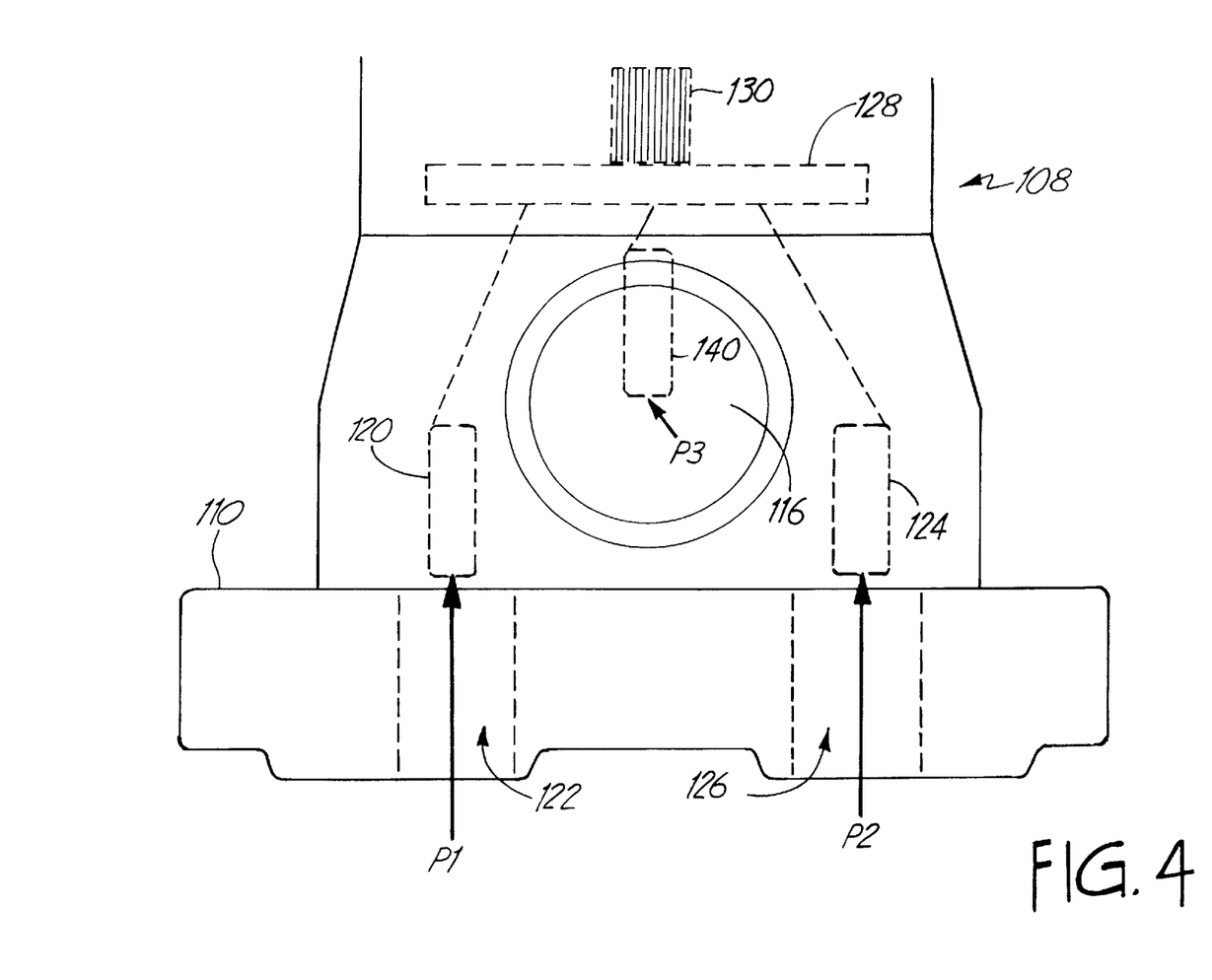
FIG. 4 shows a partial front view of an arrangement for pressure sensors in a multiple output pressure transmitter.

In FIG. 4, an enlarged front view of lower housing 108 is shown with internal features shown by dashed lines. First absolute pressure sensor 120 receives first process pressure P1 from a corresponding first process inlet 122. Second absolute pressure sensor 124 receives second process pressure P2 from a corresponding second process inlet 126. The difference between process pressure P1 and P2 is a differential process pressure, which can be either (P2−P1) or (P1−P2). A transmitter circuit card 128 couples to the first and second absolute pressure sensors 120, 124. Circuit card 128 couples via a ribbon cable 130 to further transmitter circuit boards (not shown) in upper housing 102. Together, the transmitter circuit cards form a transmitter circuit that generates a first transmitter output 104 that is a first function of differential process pressure F(P2−P1). It is understood that (P2−P1) merely equals −(P1−P2) and thus "F" , "a function of (P2−P1)," is also inherently "a function of (P1−P2)." In FIG. 4, a third absolute pressure sensor 140 couples to the transmitter circuit and is adapted to receive atmospheric pressure P3 from a third inlet 116. The transmitter circuit generates a second transmitter output that is a second function of pressure(s) G(P) different from F(P2−P1). The second function G(P) can be selected from the group of gage, atmospheric and absolute process pressures. It is also contemplated that G(P) can be a function of static pressure (0.5)(P1+P2). The operation of transmitter circuitry for generating multiple types of outputs is explained in more detail in relation to FIGS. 5–8.

Figure 5:
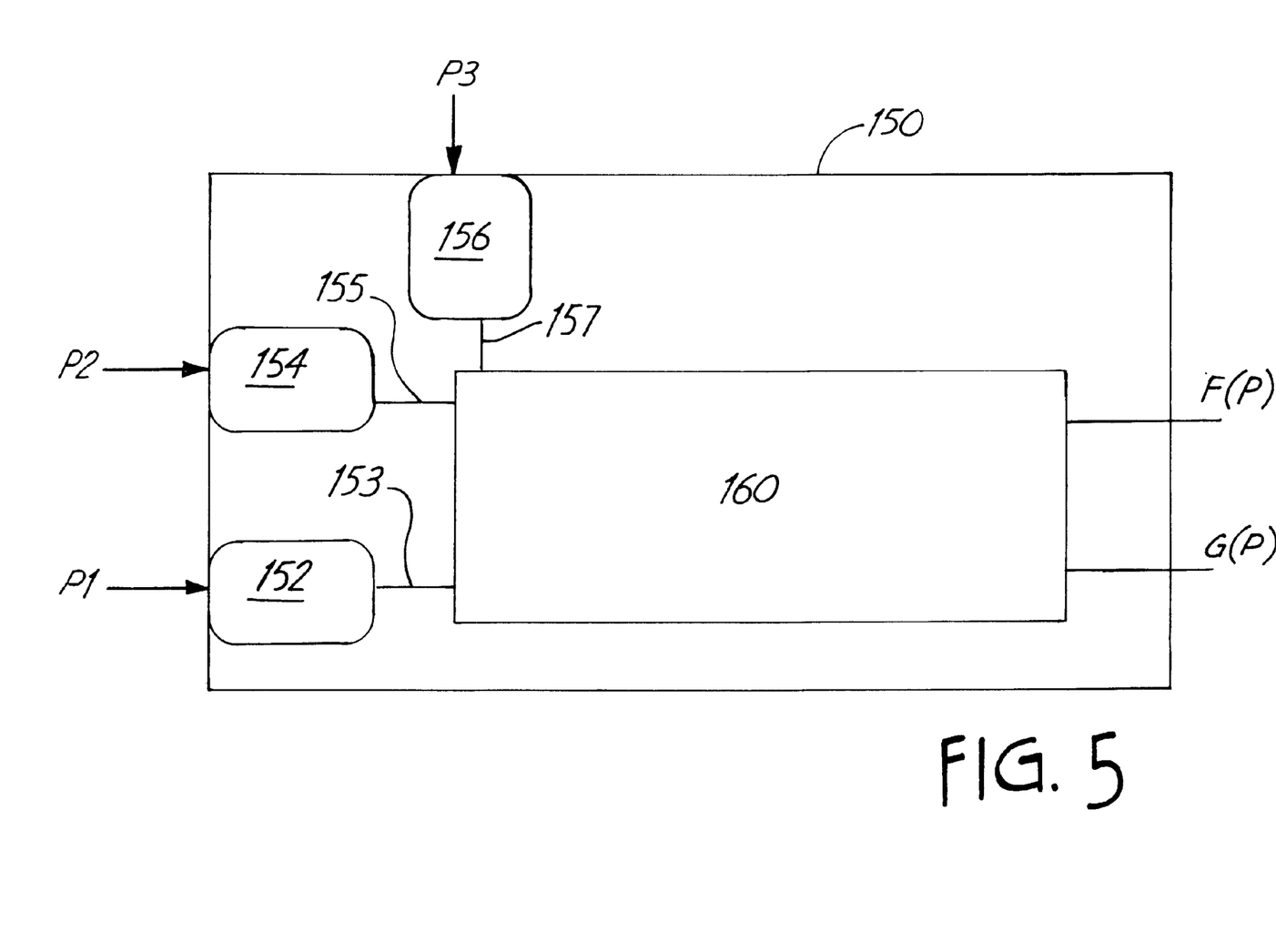
FIG. 5 shows a block diagram of an embodiment of a multiple output pressure transmitter.

In FIG. 5, an overview of a transmitter circuit is shown. A transmitter 150 includes a first absolute pressure sensor 152 receiving process pressure P1 and generating an absolute pressure sensor output 153. A second absolute pressure sensor 154 receives a second process pressure P2 and generates an absolute pressure sensor output 155. A third absolute pressure sensor 156 receives a third pressure, normally atmospheric pressure, and generates an absolute pressure sensor output 157. The absolute pressure sensor outputs 153, 155, 157 couple to transmitter circuit 160. Since the three pressure sensors are absolute pressure sensors and are each connected to different pressures, the pressure sensor outputs 153, 155, 157 are substantially independent or mathematically orthogonal to one another. Even in cases where there is some small interaction between absolute sensors from shared mounting stress or electrical leakage, the interactions are small because absolute sensors are used, and the compensation calculations are simple, with little overhead for the microprocessor. Transmitter circuit 160 can calculate the pressures P1, P2 and P3, and these outputs, representing the pressures P1, P2, and P3 are rapidly linearized and temperature compensated by the circuit because there is little or no pressure interdependence between the three sensors which would otherwise require complex line pressure compensation calculations. In some embodiments, transmitter circuit 160 calculates differential pressure as a function of two or more of sensor outputs 153, 155, and 157. In other embodiments, transmitter circuit 160 calculates differential pressure (P2−P1) by a simple subtraction and generates output F(P) as a function of (P2−P1). The transmitter also calculates a second function of pressure, G(AP1+BP2+CP3) where A, B and C are multipliers in the range of −1 to +1. Various multipliers can be set to 0 or plus 1 or minus 1 or other values to obtain a desired second type of output G(P), for examples:

G (0P1+0P2+1P3) atmospheric pressure
G (1P1+0P2−1P3) gage pressure
G (0P1+1P2−1P3) gage pressure
G (1P1+0P2+0P3) absolute pressure
G (0P1+1P2+0P3 absolute pressure
G (0.5P1+0.5P2+0P3)) static pressure.

Multipliers A, B, C can be set at the factory or by a technician at the process plant by setting switches, either hardware or software, in circuit 160.

Figure 6:
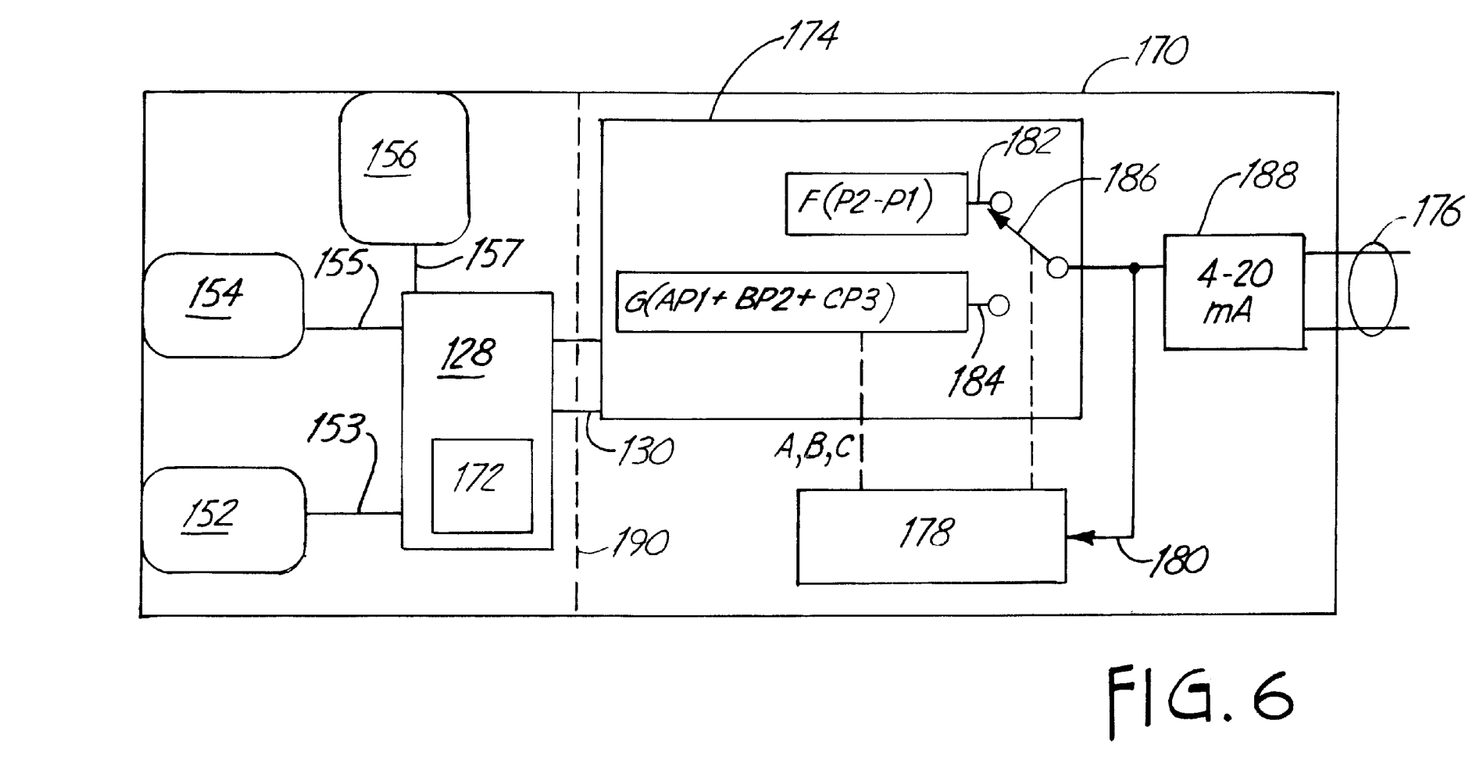
FIG. 6 shows a block diagram of an embodiment of a multiple output pressure transmitter with a 4–20 mA output.

In FIG. 6, a more detailed block diagram of an embodiment of a transmitter 170 is shown. In FIG. 6, reference numerals are shown that are the same as reference numerals used in FIGS. 4–5 and identify the same or similar elements. In FIG. 6, absolute pressure sensor outputs 153, 155, 157 couple to a transmitter circuit card 128. Transmitter circuit card 128 includes a memory 172 which stores linearization and temperature correction data for each of the three sensors 152, 154, 156. Transmitter circuit card 128 is connected by a ribbon cable 130 to transmitter circuit card 174. Transmitter circuit cards 128 and 174 joined together by ribbon cable 130 form a transmitter circuit.

Transmitter 170 connects to a two wire loop 176. Transmitter loop 176 connects to a receiver and power supply at a remote location and provides energization to transmitter 170 and also provides digital command 180 from a technician to a transmitter programming circuit 178. The transmitter generates a first transmitter output F(P2−P1) at 182 which represents differential pressure. The transmitter circuit generates a second transmitter output G(AP1+BP2+CP3) at 184 which can be absolute, gage, or atmospheric pressure depending on the multipliers A, B, C. The command 180 provides the multipliers A,B,C according to the selection of the technician. The command also actuates the software switch 186 to select either the first function 182 or the second function 184, which can be from the group G(P1), G(P2), G(P3), G(P1−P3), G(P2−P3), in other words, absolute, atmospheric or gage pressures. The selected pressure function controls the magnitude of the analog 4–20 mA current provided to loop 176.

The 4–20 mA energization and analog output current is superimposed with the digital command on the loop 176. The digital command can be an industry standard HART® signal or an industry standard FOUNDATION™ fieldbus signal. The transmitter 170 can also sequentially superimpose outputs representing all of the first and second functions on the loop 176 by transmitting them sequentially as labeled HART or FIELDBUS signals. Circuitry in the transmitter is preferably implemented as a microprocessor system or other controller such as an Application Specific Integrated Circuit (ASIC). Dashed line 190 in FIG. 6 shows a preferred modular division of the transmitter, corresponding approximately to the upper and lower housings of FIGS. 2–4. Sensors 152, 154, 156 and their characterization data 172 are preferable together in one module, typically the lower housing. If one of the sensors 152, 154, 156 fails, the lower housing can be replaced without loss of calibration. The programming of one or more sets of multipliers A, B, C is stored in the upper module. The pressure transmitter 170 has a two wire, analog 4–20 milliampere output. A programming circuit 178 coupled to the transmitter circuit is adapted to receive a programming input selecting either the first transmitter output 182 or the second transmitter output 184 as the 4–20 milliampere output, while all of various types of outputs are available sequentially as labeled digital signals on the loop.

Figure 7:
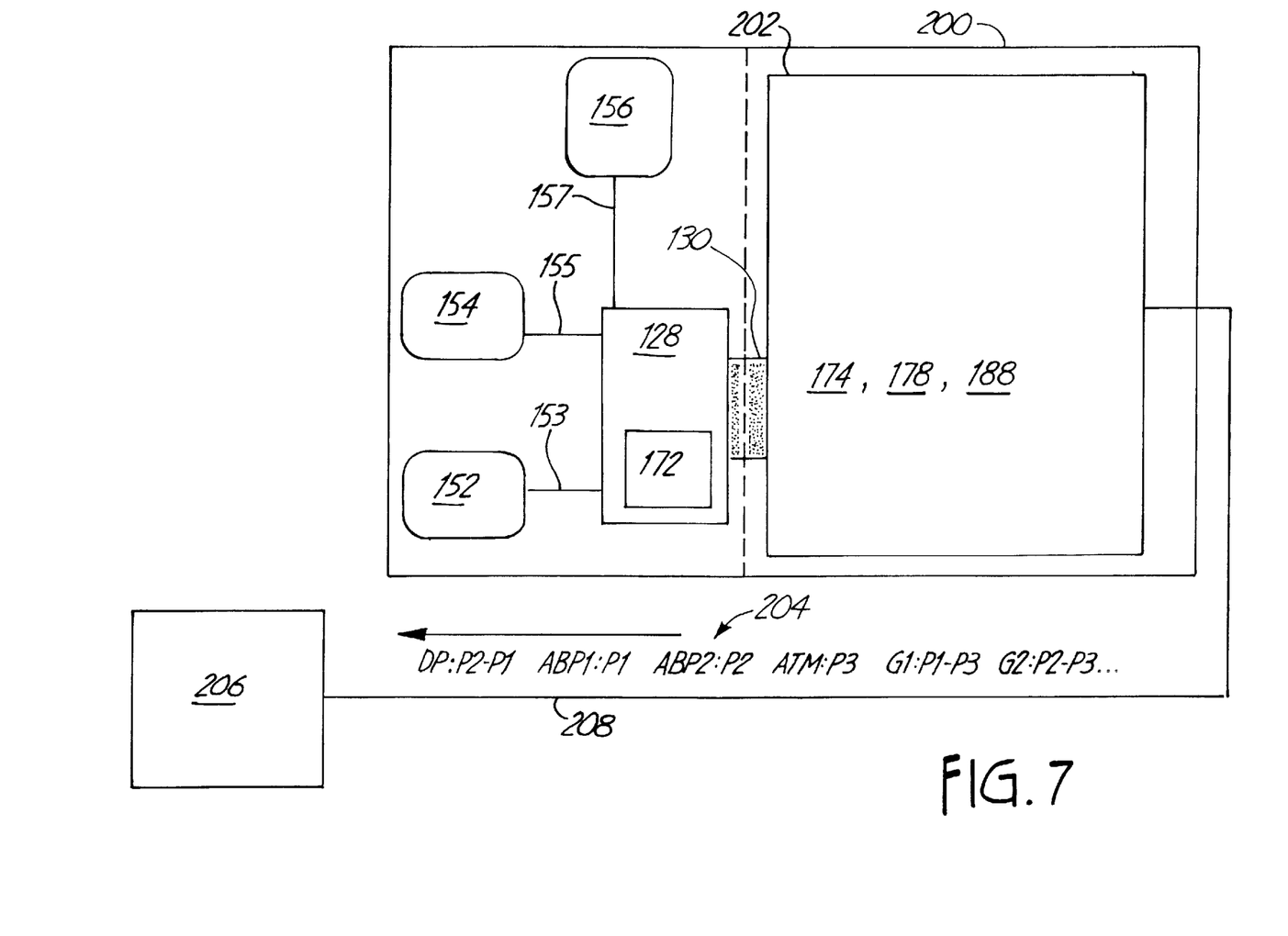
FIG. 7 shows a block diagram of an embodiment of a multiple output pressure transmitter with a serial output connected to a serial receiver.

In FIG. 7, a transmitter 200 is shown. In FIG. 7, reference numerals are shown that are the same as reference numerals used in FIG. 6 and identify the same or similar elements. In FIG. 7, a microprocessor system 202 couples via ribbon cable 130 to circuit card 128. The first and second (and further) transmitters outputs are labeled serial representations adapted for transmission to a receiver 206 that can distinguish between the first and second outputs by the labels. The labeling is done in accordance with the requirements of the serial protocol being used, for example HART or FIELDBUS. The transmitter circuit generates multiple transmitter outputs that are labeled serial representations adapted for transmission to a receiver that can distinguish the outputs by the labels, the multiple transmitter outputs representing differential pressure (P2−P1), absolute pressure P1, absolute pressure P2, atmospheric pressure P3, gage pressure (P1−P3) and gage pressure (P2−P3). Static pressure 0.5(P1+P2) can also be included, if desired. The serial representations are formatted for transmission via a process control network 208.

Figure 8:
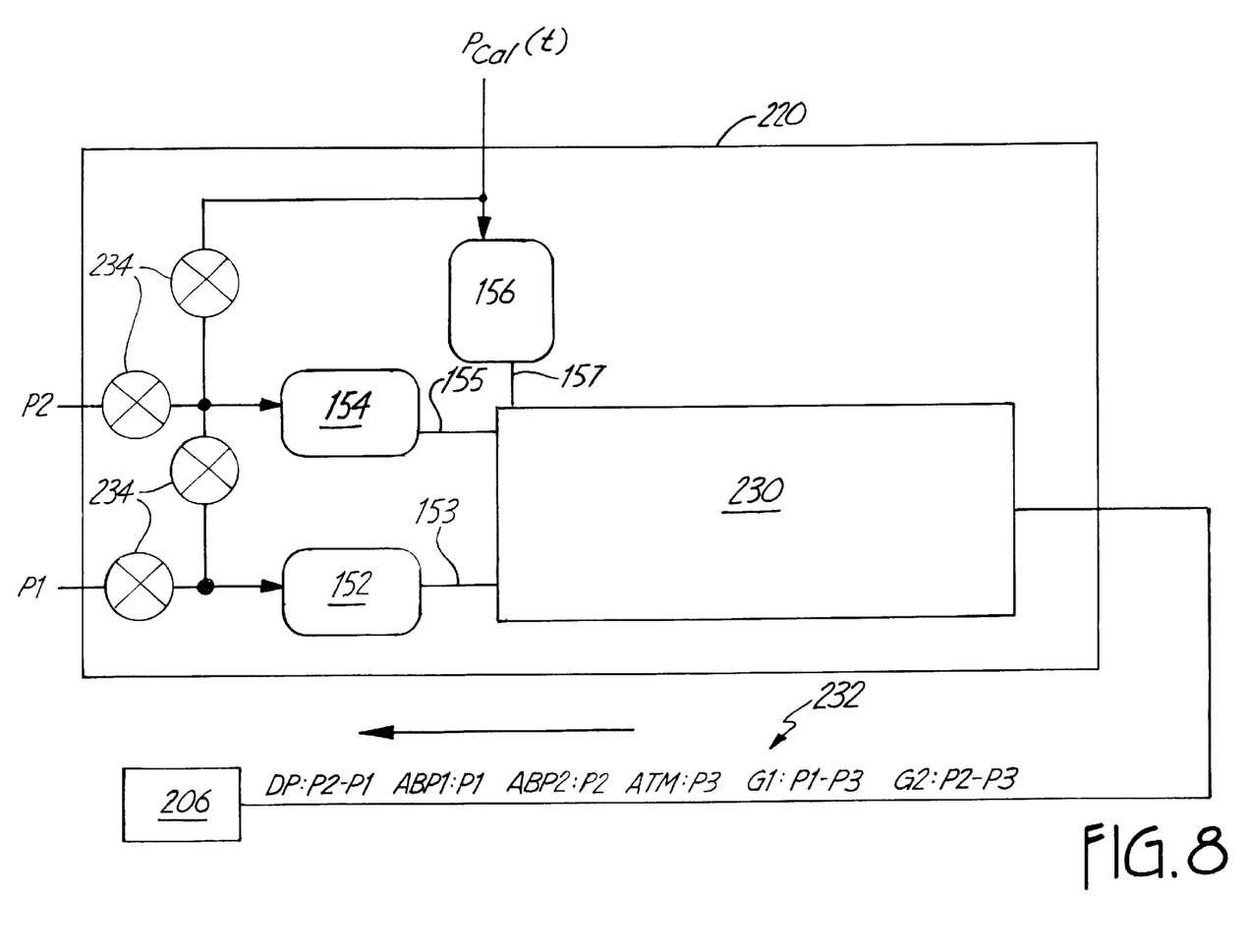
FIG. 8 shows a block diagram of an embodiment of a multiple output pressure transmitter with a valve manifold for calibration.

In FIG. 8, a pressure transmitter 220 is shown. In FIG. 8, reference numerals are shown that are the same as reference numerals used in FIGS. 6–7 and identify the same or similar elements. Absolute pressure sensor outputs 153, 155, 157 couple to transmitter circuitry 230 that generates the desired multiple outputs of different types at 232. Transmitter 220 further includes an array of manifold valves 234 that can be actuated by transmitter circuitry 230 or other circuitry to couple the fluid lines or pressure inputs of absolute pressure sensors 152, 154, 156 together, while at the same time disconnecting process pressures P1 and P2 from the sensors. A calibration pressure PCAL(t) can be applied to all of the absolute pressure sensors, and the multiple types of outputs can be observed by a technician at receiver 206 as calibration pressure PCAL varies with time. Since all of the absolute pressure sensors are connected to the same calibration pressure, the sensors 152, 154, 156 will all read the same absolute pressure, unless there is a failed sensor. The arrangement provides a calibration and diagnostic tool for the technician. The manifold is coupled to the first, second and third inlets and including a valve actuatable to couple the first, second and third inlets to each other. A diagnostic circuit can be coupled to the transmitter circuit and set an alarm if the first, second and third pressures are not substantially equal to one another after actuation of the valves 234 and with various calibration pressures applied.

Sensors 152, 154, 156 as corrected by data stored in memory 172 must track one another closely in order for electronic subtractions to work effectively. It is found that preferred absolute pressure sensors for the transmitter are integrally formed of sapphire to provide close tracking or high repeatability. Single crystal sapphire is preferred, however, sapphire which is polycrystalline or formed from nanoparticles can also be used. With the use of high accuracy sensor, such as sapphire capacitance sensors, a specified range of accurate pressure measurement that is more than 200:1 can be achieved. The sensors can be either in contact with the process fluids or atmosphere, or isolated from the process fluids or atmosphere by an arrangement with an isolator diaphragm and isolator fluid.

Although the present invention has been described with reference to preferred embodiments, workers skilled in the art will recognize that changes may be made in form and detail without departing from the spirit and scope of the invention.

What is claimed is:

1. An interchangeable pressure transmitter with differential and non-differential outputs, comprising:

first and second absolute pressure sensors adapted to receive process pressures P1 and P2 from corresponding first and second process inlets;

a transmitter circuit coupled to the first and second absolute pressure sensors, the transmitter circuit generating a first type of transmitter output that is a first function of differential process pressure F(P2−P1);

a third absolute pressure sensor coupled to the transmitter circuit, the third absolute pressure sensor being adapted to receive atmospheric pressure P3 from a third inlet different from the first and second process inlets; and the transmitter circuit generating a second type of transmitter output that is a second function of pressure G(P) different from F(P2−P1).

2. The pressure transmitter of claim 1 wherein the second function is selected from the group of gage and absolute process pressures.

3. The pressure transmitter of claim 1 wherein the second function of pressure is G(AP1+BP2+CP3) where A, B and C are multipliers in the range of −1 to +1.

4. The pressure transmitter of claim 3, further comprising:

a selection circuit coupled to the transmitter circuit and adapted to receive a command setting the multipliers A, B and C for the second transmitter output.

5. The pressure transmitter of claim 3 wherein the command can select the second function from the group G(P1), G(P2), G(P3), G(P1−P3), G(P2−P3).

6. The pressure transmitter of claim 1 wherein the pressure transmitter has a two wire, analog 4–20 milliampere output and the transmitter further comprises:

a programming circuit coupled to the transmitter circuit and adapted to receive a programming input selecting either the first transmitter output or the second transmitter output as the 4–20 milliampere output.

7. The pressure transmitter of claim 6 wherein the transmitter circuit generates multiple transmitter outputs that are labeled serial representations adapted for transmission to a receiver that can distinguish the outputs by the labels, the multiple transmitter outputs representing differential pressure (P2−P1), absolute pressure P1, absolute pressure P2, atmospheric pressure P3, gage pressure (P1−P3) and gage pressure (P2−P3).

8. The pressure transmitter of claim 1 wherein the first and second transmitters outputs are labeled first and second serial representations adapted for transmission to a receiver that can distinguish between the first and second outputs by the labels.

9. The pressure transmitter of claim 8 wherein the serial representations are formatted for transmission via a process control network.

10. The transmitter of claim 1, further comprising:

a manifold coupled to the first, second and third inlets and including a valve actuatable to couple the first, second and third inlets to each other; and a diagnostic circuit coupled to the transmitter circuit and setting an alarm if the first, second and third pressures are not substantially equal to one another after actuation of the valve.

11. The pressure transmitter of claim 1 wherein the first, second and third pressure sensors are integrally formed of sapphire.

12. The pressure transmitter of claim 11 having a specified range of accurate pressure measurement that is more than 200:1.

13. The pressure transmitter of claim 1 wherein the transmitter circuit further comprises majority voting logic to provide a second transmitter output which is an absolute pressure sensed by at least two of the first, second and third absolute pressure sensor.

14. An interchangeable pressure transmitter with differential and non-differential outputs, comprising:

two absolute pressure sensors adapted to sense pressures P1 and P2 at process inlets;

a third absolute pressure sensor adapted to sense atmospheric pressure;

a transmitter circuit coupled to the three absolute pressure sensors, the transmitter circuit generating differential and non-differential type outputs, such that the transmitter is interchangeable between differential and non-differential installations;

wherein the transmitter has a two wire, analog 4–20 milliampere output; and a programming circuit coupled to the transmitter circuit and adapted to receive a programming input selecting either differential or gage type pressure as the 4–20 milliampere output.

15. The pressure transmitter of claim 14 wherein the non-differential output is a gage pressure output.

16. The pressure transmitter of claim 14 wherein the non-differential output is an atmospheric pressure output.

17. The pressure transmitter of claim 14 wherein the non-differential output is an absolute pressure at a process inlet.

* * * * *